J. G. KROUSE.
Hay Raker and Loader.
No. 169,009. Patented Oct. 19, 1875.
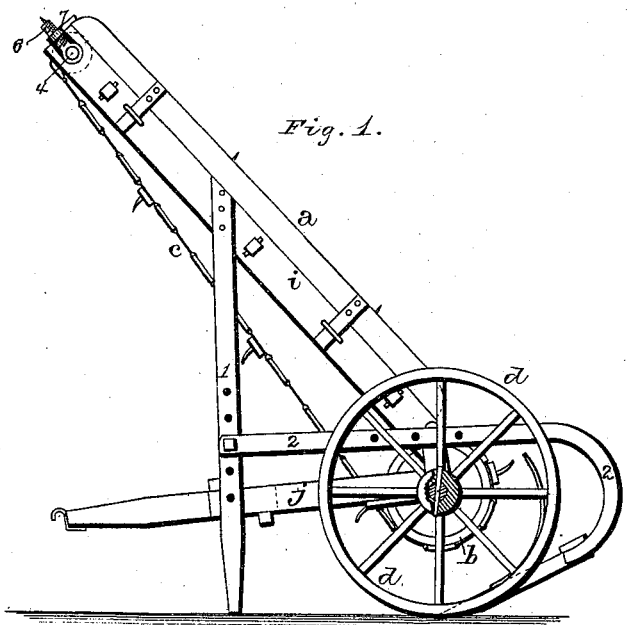
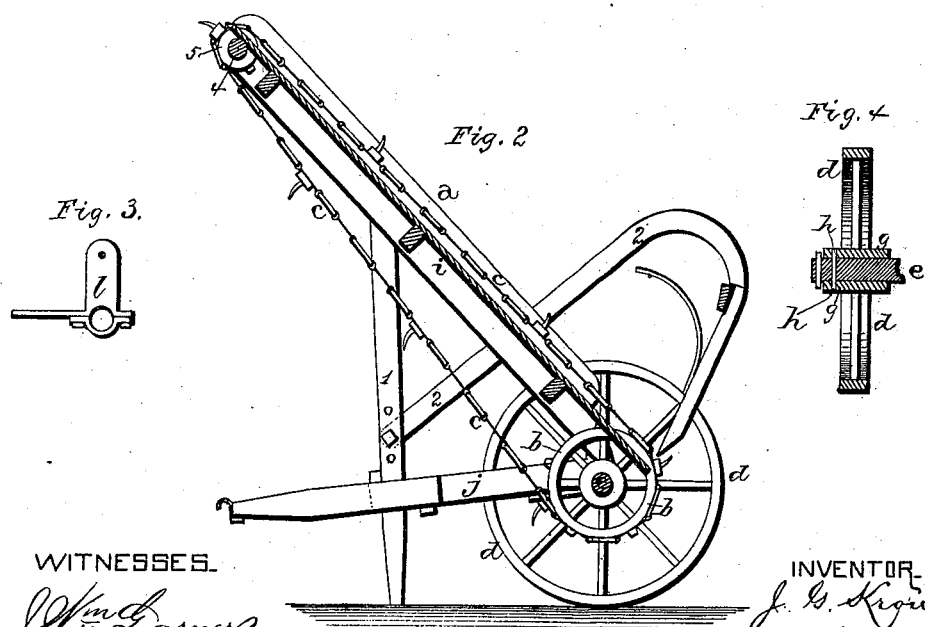

UNITED STATES PATENT OFFICE.

JOHN G. KROUSE, OF ONSLOW, IOWA.

IMPROVEMENT IN HAY RAKERS AND LOADERS.

Specification forming part of Letters Patent No. 169,009, dated October 19, 1875; application filed June 19, 1875.

*To all whom it may concern:*

Be it known that I, JNO. G. KROUSE, of Onslow, in the county of Jones and State of Iowa, have invented certain new and useful Improvements in Combined Hay Rake and Loader; and I do hereby declare the following to be a full, clear, and exact description of the invention, such as will enable others skilled in the art to which it pertains to make and use it, reference being had to the accompanying drawings, which form part of this specification.

My invention relates to an improved hay rake and loader; and it consists in, first, attaching the driving-wheels to the axle by passing removable pins through their hubs, whereby the axle, to which the pulleys that operate the rake are rigidly secured, is made to turn with the wheels and thus operate the rake; second, the arrangement and combination of parts that will be more fully described hereinafter.

Figure 1 is a side elevation of my invention. Fig. 2 is a longitudinal vertical section of the same. Figs. 3 and 4 are detailed views of the same.

$a$ represents the body of the frame, around which the endless belt $c$ passes, and which is supported by the two driving-wheels $d$. The axle $e$ of the wheels $d$, to which the two driving-pulleys $b$ are rigidly secured, has a hole through each of its ends, just inside of the outer ends of the hubs $g$, through which hubs and axle the pins $h$ are passed, when it is desired to lock the wheels and axle together. When the wheels and axles are not thus locked, the axle does not revolve, but remains stationary, when the rake at once ceases to operate. The rake is thus thrown out of gear in order to prevent it from running while the machine is being taken to and from the field, and to prevent a useless wear of the parts and a strain upon the team.

At the junction of the inclined side bars $i$ of the rake-frame and the horizontal bars $j$ are formed the metal boxes $l$, shown in Figs. 3, by means of which the whole frame-work is fastened to the axle, and in which the axle revolves while locked to the hubs of the wheels.

Pivoted to the vertical bars 1 that support the front of the rake-frame are the rake-levers 2 that extend back of the rear edges of the driving-wheels, and have the rake 3 secured to them. In both the bar 1 and levers 2 there are a number of holes made, by means of which the point of draft for the rake can be raised and lowered, so as to incline the points of the teeth more or less toward the ground. Where the soil is rough and stony the ends of the levers are raised upward to such a degree that the points of the rake skim over the ground, and in case they strike any obstruction they throw the rake upward, so as to pass over it without stopping the forward movement of the machine. In the upper ends of the side bars $i$ are made deep slots to receive the ends of the shaft 4 upon which the pulleys 5 are secured. The ends of the shaft pass through eyes in the ends of the adjusting screw-rods 6, so that, by screwing down the nuts 7, the shaft can be drawn outward or forced inward at will, to tighten or loosen the endless belt $c$.

Having thus described my invention, I claim—

1. In a hay-loader, the combination of the axle $e$, wheel $d$, having the perforated hub $g$ and removable pin $h$, with the rollers $b$ rigidly secured to said axle, whereby the wheels can be locked to the axle so as to cause the apron to revolve or allowed to freely revolve without operating the apron, substantially as set forth.

2. The perforated standard 1 that supports the front of the machine, in combination with the draft-bars 2, the end of the bars being made adjustable up and down, so as to change the angle at which the rake-teeth shall touch the ground, substantially as shown and described.

In testimony that I claim the foregoing, I have hereunto set my hand this 10th day of June, 1875.

JOHN G. KROUSE.

Witnesses:
F. A. LEHMANN,
J. WILLIAM GARNER.